US012597643B2

(12) United States Patent
Tanaka et al.

(10) Patent No.: US 12,597,643 B2
(45) Date of Patent: Apr. 7, 2026

(54) LAMINATED ALL-SOLID-STATE BATTERY

(71) Applicant: TDK CORPORATION, Tokyo (JP)

(72) Inventors: Kazumasa Tanaka, Tokyo (JP); Teiichi Tanaka, Tokyo (JP); Keiko Takeuchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 762 days.

(21) Appl. No.: 17/794,380

(22) PCT Filed: Dec. 25, 2020

(86) PCT No.: PCT/JP2020/048828
§ 371 (c)(1),
(2) Date: Jul. 21, 2022

(87) PCT Pub. No.: WO2021/149458
PCT Pub. Date: Jul. 29, 2021

(65) Prior Publication Data
US 2023/0064294 A1    Mar. 2, 2023

(30) Foreign Application Priority Data
Jan. 24, 2020    (JP) ................................. 2020-009570

(51) Int. Cl.
$H01M\ 10/0585$    (2010.01)
$H01M\ 10/0525$    (2010.01)
$H01M\ 10/0562$    (2010.01)
(52) U.S. Cl.
CPC ... *H01M 10/0585* (2013.01); *H01M 10/0525* (2013.01); *H01M 10/0562* (2013.01);
(Continued)
(58) Field of Classification Search
CPC ......... H01M 10/0525; H01M 10/0562; H01M 2300/0065; H01M 2300/0068
See application file for complete search history.

(56) References Cited

U.S. PATENT DOCUMENTS

2016/0336617 A1* 11/2016 Yamazaki ......... H01M 10/0525
2017/0054181 A1* 2/2017 Sasaki ............... H01M 10/0587

FOREIGN PATENT DOCUMENTS

JP        2019140024 A  *  8/2019
WO        2013/175993 A1    11/2013
WO        WO-2018123479 A1 * 7/2018  ............... H01B 1/06

OTHER PUBLICATIONS

Mar. 16, 2021 International Search Report issued in International Patent Application No. PCT/JP2020/048828.

* cited by examiner

*Primary Examiner* — Ula C Ruddock
*Assistant Examiner* — Sydney L Kline
(74) *Attorney, Agent, or Firm* — Oliff PLC

(57)        ABSTRACT

A laminated all-solid-state battery includes a laminate having positive electrode and positive electrode active material layers, negative electrode layers having negative electrode current collector and negative electrode active material layers, and solid electrolyte layers. The positive and negative electrode layers are alternately laminated with the solid electrolyte layers interposed. The solid electrolyte layers include solid electrolyte layers belonging to first and second groups, the second thicker than the first. The first group includes a first solid electrolyte layer being thinnest. The second group is composed of a second solid electrolyte layer having a thickness of twice or more that of the first. A relationship (1) is satisfied when an average thickness of the plurality of solid electrolyte layers belonging to the first group is defined as $t_a$ and an average thickness of the solid electrolyte layers belonging to the second group is defined as $t_b$; $2t_a \le t_b \dots$ (1).

7 Claims, 4 Drawing Sheets

(52) U.S. Cl.
CPC .............. *H01M 2300/0065* (2013.01); *H01M 2300/0068* (2013.01)

LAMINATED ALL-SOLID-STATE BATTERY

TECHNICAL FIELD

The present invention relates to a laminated all-solid-state battery.

Priority is claimed on Japanese Patent Application No. 2020-009570 filed on Jan. 24, 2020, the content of which is incorporated herein by reference.

BACKGROUND ART

In recent years, developments in electronics technology have been remarkable, and portable electronic devices have become smaller and lighter, thinner, and more multifunctional. Along with that, there is a strong demand for batteries serving as power sources of electronic devices to be smaller and lighter, thinner, and more reliable, and all-solid-state lithium ion secondary batteries formed of a solid electrolyte have attracted attention.

Currently, in a commonly used lithium ion secondary battery, an electrolyte (electrolytic solution) such as an organic solvent has been conventionally used as a medium for moving ions. However, in a lithium ion secondary battery using an electrolytic solution, there is a risk that the electrolytic solution may leak out. Since an organic solvent or the like used in the electrolytic solution is a combustible substance, it is required to further enhance the safety of batteries.

Therefore, as one of the measures for enhancing the safety of lithium ion secondary batteries, it has been proposed to replace an electrolytic solution, which is an electrolyte, with a solid electrolyte. Further, development of an all-solid-state battery in which other components are also formed of solids is underway.

It is generally said to be preferable that a solid electrolyte forming an all-solid-state battery is dense, but there is a problem in that an internal stress acts on the all-solid-state battery due to volume expansion and contraction of an electrode layer according to a charge/discharge reaction of lithium ions, and cracks occur. As a result, it was found that the internal resistance increased and cycle characteristics deteriorated.

In response to such problems, according to Patent Literature 1, when a solid electrolyte layer in which a low porosity portion is formed in a region close to an electrode layer and a solid electrolyte layer in which a high porosity portion is formed in a region away from the electrode layer are provided, an internal stress applied to the solid electrolyte layer due to volume expansion and contraction can be alleviated, a discharge capacity increases, and cycle characteristics improve.

CITATION LIST

Patent Literature

[Patent Literature 1]
PCT International Publication No. WO 2013/175993

SUMMARY OF INVENTION

Technical Problem

However, in the laminated all-solid-state battery in which the solid electrolyte layer as in Patent Literature 1 is provided, an internal resistance of the solid electrolyte layer was rather increased, and sufficient cycle characteristics could not be obtained. Also, there has been a concern that an internal stress due to volume expansion and contraction may be concentrated on the solid electrolyte layer having a high porosity, and cracks may occur easier in the solid electrolyte layer.

An objective of the present invention is to provide a laminated all-solid-state battery that suppresses occurrence of cracks and has excellent cycle characteristics.

Solution to Problem

The present invention provides the following means to solve the above-described problems.

A laminated all-solid-state battery according to a first aspect of the present invention is a laminated all-solid-state battery including a laminate which has a plurality of positive electrode layers each including a positive electrode current collector layer and a positive electrode active material layer, a plurality of negative electrode layers each including a negative electrode current collector layer and a negative electrode active material layer, and a plurality of solid electrolyte layers each including a solid electrolyte, and in which the positive electrode layers and the negative electrode layers are alternately laminated with the solid electrolyte layers each interposed therebetween, in which the plurality of solid electrolyte layers include a plurality of solid electrolyte layers belonging to a first group and at least one solid electrolyte layer belonging to a second group which has a thickness larger than that of the first group, the first group includes a first solid electrolyte layer having a smallest thickness, the second group is composed of at least one second solid electrolyte layer in which the thickness is twice or more that of the first solid electrolyte layer, and a relationship of the following expression (1) is satisfied when an average thickness of the plurality of solid electrolyte layers belonging to the first group is defined as $t_a$ and an average thickness of the solid electrolyte layers belonging to the second group is defined as $t_b$.

$$2t_a \leq t_b \tag{1}$$

In the laminated all-solid-state battery according to the above-described aspect, the first group may be composed of the first solid electrolyte layer and a third solid electrolyte layer having a thickness less than twice that of the first solid electrolyte layer.

Further, $t_b$ with respect to $t_a$ may satisfy the following expression (2).

$$2t_a \leq t_b \leq 10t_a \tag{2}$$

Further, the number of layers of the solid electrolyte layer of the first group may be larger than the number of layers of the solid electrolyte layer of the second group.

The solid electrolyte layers belonging to the first group and the solid electrolyte layers belonging to the second group may contain solid electrolytes having the same crystal structure.

The solid electrolyte layers belonging to the first group and the solid electrolyte layers belonging to the second group may contain a solid electrolyte having a crystal structure of any one selected from the group consisting of a NASICON type, a garnet type, a perovskite type, and a LISICON type.

Advantageous Effects of Invention

The laminated all-solid-state battery according to the present invention suppresses occurrence of cracks and has excellent cycle characteristics.

DESCRIPTION OF EMBODIMENTS

Figure 1:
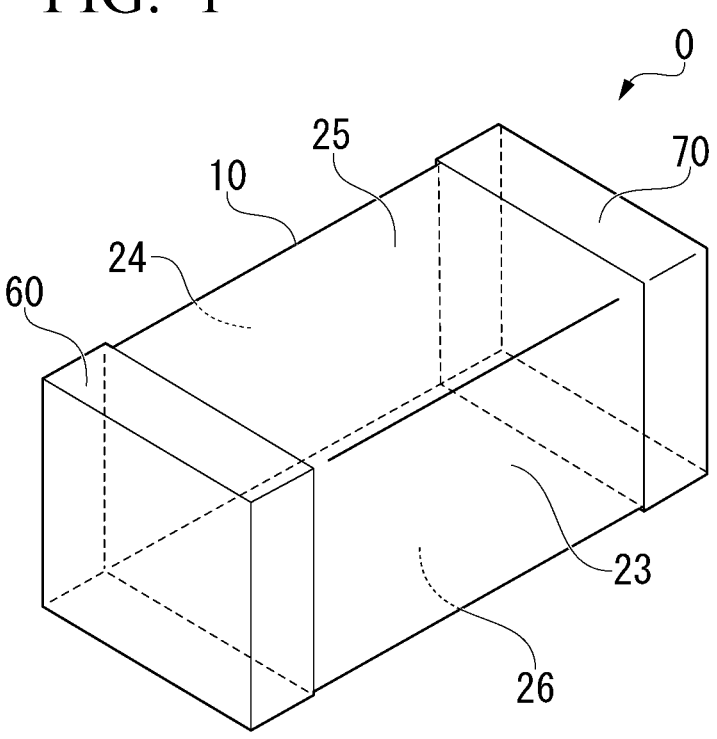
FIG. 1 is an external view of a laminated all-solid-state battery according to a first embodiment of the present invention.

Hereinafter, one embodiment of the present invention will be described in detail with reference to the drawings as appropriate. In the drawings used in the following description, there are cases in which illustration is simplified for convenience so that characteristics of the present embodiment can be easily understood, and dimensional proportions or the like of respective components may be different from actual ones. Materials, dimensions, and the like exemplified in the following description are merely examples, and the present embodiment is not limited thereto and can be implemented with appropriate modifications within a range in which the effects of the present invention are achieved. For example, configurations described in different embodiments can be appropriately combined and implemented.

As a laminated all-solid-state battery, an all-solid-state lithium ion secondary battery, an all-solid-state sodium ion secondary battery, an all-solid-state potassium ion secondary battery, an all-solid-state magnesium ion secondary battery, or the like can be exemplified. Hereinafter, an all-solid-state lithium ion secondary battery will be described as an example, but the present invention is generally applicable to any laminated all-solid-state secondary battery.

First Embodiment (Laminated All-Solid-State Battery)

Figure 2:
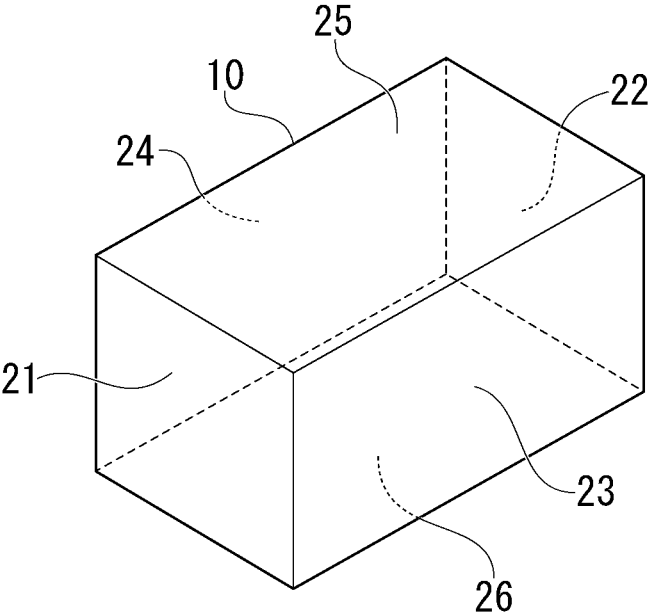
FIG. 2 is an external view of a laminate according to the first embodiment of the present invention.
Figure 3:
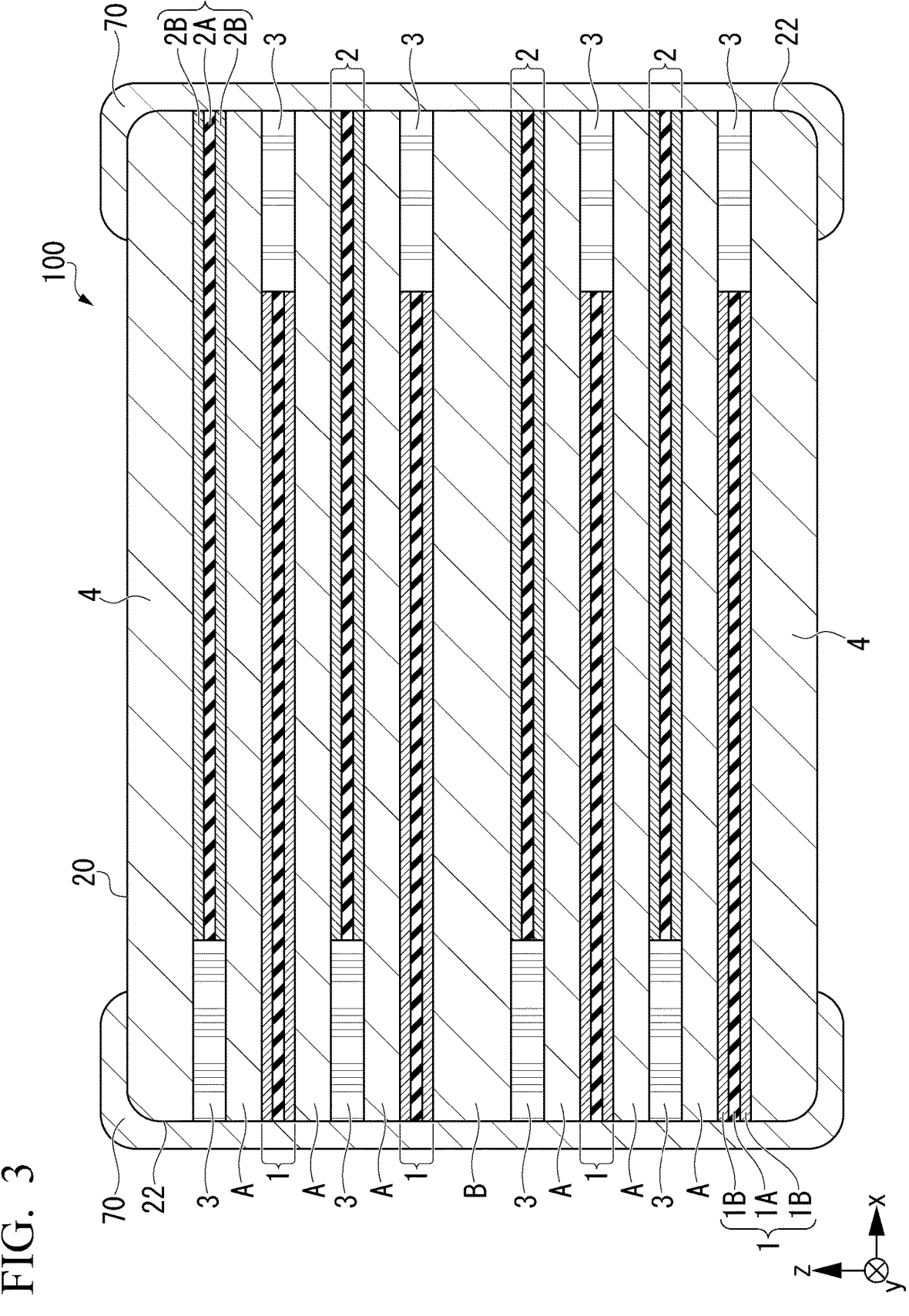
FIG. 3 is a cross-sectional view of the laminated all-solid-state battery according to the first embodiment of the present invention.

A laminated all-solid-state battery of the present embodiment will be described with reference to FIGS. 1 to 3. As illustrated in FIG. 1, a laminated all-solid-state battery 0 of a first embodiment includes a laminate 10, an outer positive electrode 60, and an outer negative electrode 70. As illustrated in FIG. 2, the laminate 10 is a hexahedron and has four side surfaces including a side surface 21, a side surface 22, a side surface 23, and a side surface 24, an upper surface 25, and a lower surface 26. The outer positive electrode 60 and the outer negative electrode 70 are formed on any side surface of a pair of facing side surfaces. In the embodiment of the laminated all-solid-state battery 0 of FIG. 1, the outer positive electrode 60 is formed on the side surface 21 and the outer negative electrode 70 is formed on the side surface 22 in the laminate 10 of FIG. 2.

Next, a laminated all-solid-state battery 100 of the present embodiment will be described with reference to the cross-sectional view of FIG. 3. In the laminated all-solid-state battery 100, a positive electrode layer 1 including a positive electrode current collector layer 1A, a positive electrode active material layer 1B, and a side margin layer 3, and a negative electrode layer 2 including a negative electrode current collector layer 2A, a negative electrode active material layer 2B, and the side margin layer 3 are alternately laminated with a solid electrolyte layer interposed therebetween. The solid electrolyte layer preferably includes a laminate 20 having at least a power storage element that sandwiches a solid electrolyte layer A and a solid electrolyte layer B having a larger thickness than that of the solid electrolyte layer A, and outer layers 4 that sandwich the power storage element. The solid electrolyte layer A and the solid electrolyte layer B disposed closest to each other are laminated with the positive electrode layer 1 or the negative electrode layer 2 interposed therebetween.

In the present embodiment, an example in which thicknesses of a plurality of solid electrolyte layers A are the same as each other, and a thickness of the solid electrolyte layer B is twice or more the thickness of the solid electrolyte layer A will be described. In the present embodiment, the plurality of solid electrolyte layers A are first solid electrolyte layers belonging to a first group. In the present embodiment, the solid electrolyte layer B is a second solid electrolyte layer belonging to a second group. The positive electrode layer 1 is electrically joined to the outer positive electrode 60 on the side surface 21, and the negative electrode layer 2 is electrically joined to the outer negative electrode 70 on the side surface 22.

When an average thickness of the solid electrolyte layers A is $t_a$ and an average thickness of the solid electrolyte layer B is $t_b$, the all-solid-state battery 100 satisfies the following expression (1). In the present embodiment, the thicknesses of the solid electrolyte layers A are the same as each other, and the average thickness of the solid electrolyte layers A means the thickness of the solid electrolyte layer A.

$$2t_a \leq t_b \tag{1}$$

The laminated all-solid-state battery 100 having such a configuration can suppress volume expansion caused by a charge/discharge reaction of lithium ions. Although details of this factor are not clear, it can be thought that, when the solid electrolyte layer B having a thickness of twice or more a thickness of the solid electrolyte layer A is at least provided in the laminated all-solid-state battery 100, a stress load of volume expansion due to a charge/discharge reaction is dispersed by the solid electrolyte layer B, cracks in the laminate can be suppressed, and as a result, cycle characteristics are improved. On the other hand, in a laminated all-solid-state battery 200 not including the solid electrolyte layer B, since a stress load of volume expansion is not dispersed, cracks are likely to occur in the laminate, and an internal resistance thereof may be locally increased. Therefore, a current is concentrated in a portion in which the internal resistance is low, and the cycle characteristics tend to deteriorate.

Further, $t_b$ with respect to $t_a$ described above preferably satisfies the following expression (2).

$$2t_a \leq t_b \leq 10t_a \tag{2}$$

Further, the number of layers of the solid electrolyte layer A may be larger than the number of layers of the solid electrolyte layer B.

When the solid electrolyte layer B having an average thickness of 10 times or more the average thickness of the solid electrolyte layer A is provided, the internal resistance of the laminated all-solid-state battery increases due to the solid electrolyte layer B, and capacity may decrease.

Further, the solid electrolyte layer A and the solid electrolyte layer B preferably contain a solid electrolyte having the same crystal structure.

Further, the solid electrolyte preferably has a crystal structure of any one type of a NASICON type, a garnet type, and a perovskite type exhibiting high ionic conductivities.

When the solid electrolyte layer A and the solid electrolyte layer B contain a solid electrolyte having the same crystal structure, ionic conductivities thereof are the same, and thereby a charge/discharge reaction occurs uniformly on both sides. Therefore, since a stress load due to volume expansion is uniformly generated on both sides, cracks inside the laminate are suppressed and cycle characteristics as a battery are improved. On the other hand, when solid electrolytes having different crystal structures are provided, since ionic conductivities are different from each other, charge/discharge reactions on both sides are non-uniform. Therefore, stress loads due to volume expansion on both sides are also non-uniform. Therefore, cracks are likely to occur inside the laminate.

Figure 4:
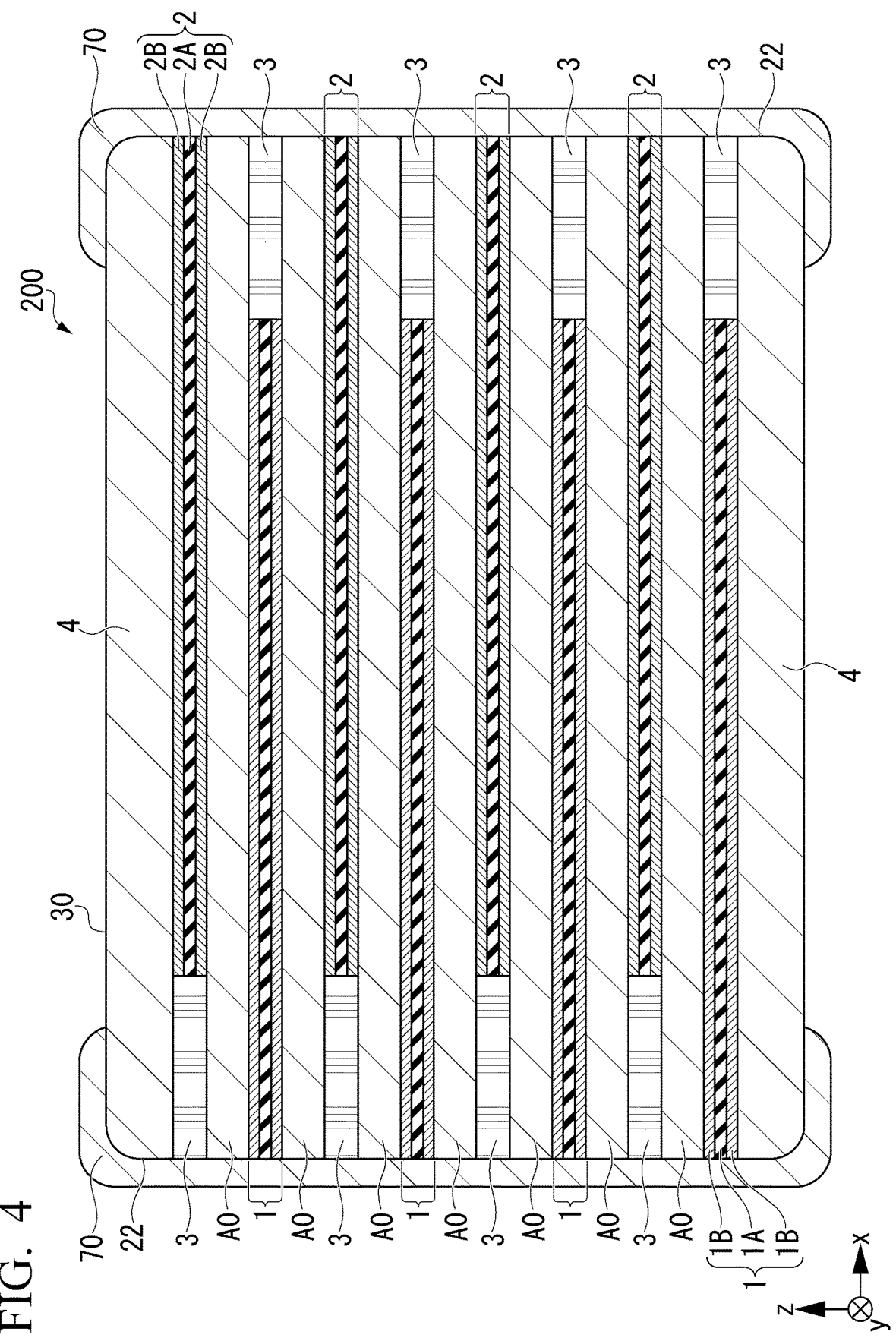
FIG. 4 is a cross-sectional view of a laminated all-solid-state battery according to a comparative example in the present application.

FIG. 4 illustrates a cross-sectional view of the laminated all-solid-state battery 200 according to a comparative example. The laminated all-solid-state battery 200 according to the comparative example is not included in the present invention. The laminated all-solid-state battery 200 is a laminate 30 including a plurality of power storage elements in which the positive electrode layers 1 and the negative electrode layers 2 are alternately laminated with solid electrolyte layers A0 having substantially the same thickness interposed therebetween, and the outer layers 4 sandwiching the power storage elements, in which the positive electrode layer 1 is electrically joined to the outer positive electrode 60 via the side surface 21, and the negative electrode layer 2 is electrically joined to the outer negative electrode 70 via the side surface 22. The laminated all-solid-state battery 200 is different from the all-solid-state battery 100 according to the first embodiment in that it does not include the solid electrolyte layer B belonging to the second group.

It is noted that, as a description in the following specification, either one or both of the positive electrode active material and the negative electrode active material may be collectively referred to as an active material, either one or both of the positive electrode current collector layer and the negative electrode current collector layer may be collectively referred to as a current collector layer, either one or both of the positive electrode active material layer and the negative electrode active material layer may be collectively referred to as an active material layer, either one or both of the positive electrode and the negative electrode are collectively referred to as an electrode, and either one or both of the outer positive electrode and the outer negative electrode may be collectively referred to as an outer electrode.

(Solid Electrolyte Layer)

The solid electrolyte layer A and the solid electrolyte layer B of the laminated all-solid-state battery 100 of the present embodiment are not particularly limited, and may include a solid electrolyte layer having a crystal structure of any one selected from the group consisting of, for example, a NASICON-type, a garnet-type, a perovskite-type, and a LISICON-type crystal structures. For example, a general solid electrolyte material such as an oxide-based lithium ion conductor having a crystal structure of a NASICON type, a garnet type, a perovskite type, and a LISICON type can be used. As the solid electrolyte material, at least one type of an ion conductor (for example, $Li_{1+x}Al_xTi_{2-x}(PO_4)_3$; LATP) having a NASICON-type crystal structure containing at least Li (lithium), M (M is at least one of Ti (titanium), Zr (zirconium), Ge (germanium), Hf (hafnium), and Sn (tin)), P (phosphorus), and O (oxygen), an ion conductor (for example, $Li_7La_3Zr_2O_{12}$; LLZ) having a garnet-type crystal structure containing at least Li (lithium), Zr (zirconium), La (lanthanum), and O (oxygen) or an ion conductor having a garnet-type similar structure, an ion conductor (for example, $Li_{3x}La_{2/3-x}TiO_3$; LLTO) having a perovskite-type structure containing at least Li (lithium), Ti (titanium), La (lanthanum), and O (oxygen), and a lithium ion conductor (for example, $Li_{3.5}Si_{0.5}P_{0.5}O_{3.5}$: LSPO) having a LISICON-type crystal structure containing at least Li, Si, P, and O can be exemplified. That is, one type of these ion conductors may be used, or two or more types thereof may be used in combination.

As a solid electrolyte material of the present embodiment, it is preferable to use a lithium ion conductor having a NASICON-type crystal structure, and is preferable to include a solid electrolyte material represented by, for example, $LiTi_2(PO_4)_3$ (LTP), $LiZr_2(PO_4)_3$ (LZP), $Li_{1+x}Al_xTi_{2-x}(PO_4)_3$ (LATP, $0<x\le0.6$)), $Li_{1+x}Al_xGe_{2-x}(PO_4)_3$ (LAGP, $0<x\le0.6$), and $Li_{1+x}Y_xZr_{2-x}(PO_4)_3$ (LYZP, $0<x\le0.6$).

(Positive Electrode Layer and Negative Electrode Layer)

A plurality of positive electrode layers 1 and a plurality of negative electrode layers 2 are provided, for example, in the laminate 20, and face each other with a solid electrolyte layer interposed therebetween.

The positive electrode layer 1 includes the positive electrode current collector layer 1A, the positive electrode active material layer 1B, and the side margin layer 3. The negative electrode layer 2 includes the negative electrode current collector layer 2A and the negative electrode active material layer 2B.

(Positive Electrode Active Material Layer and Negative Electrode Active Material Layer)

The positive electrode active material layer 1B and the negative electrode active material layer 2B according to the present embodiment contain known materials at least capable of absorbing and desorbing lithium ions as the positive electrode active material and the negative electrode active material. In addition, a conductive auxiliary agent and an ion-conductive auxiliary agent may be contained. It is preferable that the positive electrode active material and the negative electrode active material can efficiently absorb and desorb lithium ions.

As the positive electrode active material and the negative electrode active material, for example, a transition metal oxide and a transition metal composite oxide can be exemplified. Specific examples of the positive electrode active material and the negative electrode active material include, for example, lithium manganese composite oxide $Li_2Mn_aMa_{1-a}O_3$ ($0.8\le a\le1$, Ma=Co, Ni), lithium cobalt oxide ($LiCoO_2$), lithium nickel oxide ($LiNiO_2$), lithium manganese spinel ($LiMn_2O_4$), a composite metal oxide represented by a general expression: $LiNi_xCo_yMn_zO_2$ ($x+y+z=1$, $0\le x\le1$, $0\le y\le1$, $0\le z\le1$), a lithium vanadium compound ($LiV_2O_5$), olivine type $LiMbPO_4$ (in which, Mb represents one or more elements selected from Co (cobalt), Ni (nickel), Mn (manganese), Fe (iron), Mg (magnesium), Nb (niobium), Ti (titanium), Al (aluminum), and Zr (zirconium)), lithium vanadium phosphate ($Li_3V_2(PO_4)_3$ or $LiVOPO_4$), Li-excess solid solution positive electrode represented by $Li_2MnO_3$—$LiMcO_2$ (Mc=Mn, Co, Ni), lithium titanate ($Li_4Ti_5O_{12}$), titanium oxide ($TiO_2$), a composite metal oxide represented by $Li_sNi_tCo_uAl_vO_2$ ($0.9<s<1.3$, $0.9<t+u+v<1.1$), or the like.

The positive electrode active material and the negative electrode active material of the present embodiment preferably contain a phosphoric acid compound as a main component, for example, one or more of olivine type $LiMbPO_4$ (in which, Mb represents one or more elements selected from Co, Ni, Mn, Fe, Mg, Nb, Ti, Al, and Zr), lithium vanadium phosphate ($LiVOPO_4$, $Li_3V_2(PO_4)_3$, and $Li_4(VO)$$(PO_4)_2$), and lithium vanadium pyrophosphate ($Li_2VOP_2O_7$ and $Li_2VP_2O_7$, and $Li_9V_3(P_2O_7)_3(PO_4)_2$) are preferable, and either one or both of $LiVOPO_4$ and $Li_3V_2(PO_4)_3$ are particularly preferable.

The main component in the present embodiment means that a proportion of the active material of the phosphoric acid compound is larger than 50 parts by mass when a total amount of the positive electrode active material and the negative electrode active material is 100 parts by mass, and the proportion of the active material of the phosphoric acid compound is preferably 80 parts by mass or more.

In these positive electrode active material and negative electrode active material, a part of each element may be substituted with a different element, or they may vary from a stoichiometric composition. $LiVOPO_4$ and $Li_3V_2(PO_4)_3$ are preferably deficient in lithium, and are more preferably $Li_xVOPO_4$ ($0.94 \leq x \leq 0.98$) or $Li_yV_2(PO_4)_3$ ($2.8 \leq y \leq 2.95$).

As the negative electrode active material, for example, Li metal, Li—Al alloy, Li—In alloy, carbon, silicon (Si), silicon oxide ($SiO_x$), lithium titanate ($Li_4Ti_5O_{12}$), and titanium oxide ($TiO_2$) can be used.

Here, there is no clear distinction between the active materials forming the positive electrode active material layer 1B and the negative electrode active material layer 2B, and when potentials of two types of compounds, that is, a compound in the positive electrode active material layer and a compound in the negative electrode active material layer, are compared, a compound exhibiting a higher potential can be used as the positive electrode active material, and a compound exhibiting a lower potential can be used as the negative electrode active material. As long as it is a compound having both functions of absorbing and desorbing lithium ions, the same material may be used as the material forming the positive electrode active material layer 1B and the negative electrode active material layer 2B.

As the conductive auxiliary agent, carbon materials such as carbon black, acetylene black, Ketjen black, carbon nanotubes, graphite, graphene, and activated carbon, and metal materials such as gold, silver, palladium, platinum, copper and tin can be exemplified.

The ion-conductive auxiliary agent is, for example, a solid electrolyte. As the solid electrolyte, specifically, the same material as a material used for, for example, a solid electrolyte layer 50 can be used.

When a solid electrolyte is used as the ion-conductive auxiliary agent, it is preferable to use the same material for the ion-conductive auxiliary agent and the solid electrolyte used for the solid electrolyte layers A and B.

(Positive Electrode Current Collector and Negative Electrode Current Collector)

As the material forming the positive electrode current collector layer 1A and the negative electrode current collector layer 2A of the laminated all-solid-state battery 100 of the present embodiment, it is preferable to use a material having high conductivity and, for example, silver, palladium, gold, platinum, aluminum, copper, nickel, or the like is preferably used. Particularly, copper is more preferable because it does not easily react with an oxide-based lithium ion conductor, and furthermore, has an effect of reducing an internal resistance of the laminated all-solid-state battery. As the materials forming the positive electrode current collector layer 1A and the negative electrode current collector layer 2A, the same material may be used or different materials may be used.

It is preferable that the positive electrode current collector layer 1A and the negative electrode current collector layer 2A of the laminated all-solid-state battery 100 of the present embodiment contain a positive electrode active material and a negative electrode active material, respectively.

When the positive electrode current collector layer 1A and the negative electrode current collector layer 2A respectively contain a positive electrode active material and a negative electrode active material, this is desirable because adhesion between the positive electrode current collector layer 1A and the positive electrode active material layer 1B and between the negative electrode current collector layer 2A and the negative electrode active material layer 2B is improved.

Proportions of the positive electrode active material and the negative electrode active material in the positive electrode current collector layer 1A and the negative electrode current collector layer 2A of the present embodiment are not particularly limited as long as the current collectors perform their own functions, but a volume ratio between the positive electrode current collector and the positive electrode active material, or the negative electrode current collector and the negative electrode active material is preferably in a range of 90/10 to 70/30.

(Side Margin Layer)

The side margin layer 3 of the laminated all-solid-state battery 100 of the present embodiment is preferably provided to eliminate a step between the solid electrolyte layer A and the positive electrode layer 1 and a step between the solid electrolyte layer A and the negative electrode layer 2. Therefore, the side margin layer 3 indicates a region other than the positive electrode layer 1. Since the steps between the solid electrolyte layer A, and the positive electrode layer 1 and the negative electrode layer 2 are eliminated due to the presence of the side margin layers 3, denseness of the electrodes is increased, and delamination and warpage due to calcination of the laminated all-solid-state battery 100 do not easily occur.

A material forming the side margin layer 3 preferably contains, for example, the same material as the solid electrolyte layer A. Therefore, the material forming the side margin layer 3 preferably contains an oxide-based lithium ion conductor having a crystal structure of a NASICON type, a garnet type, or a perovskite type. As the lithium ion conductor, an ion conductor having a NASICON-type crystal structure containing at least Li, M (M is at least one of Ti (titanium), Zr (zirconium), Ge (germanium), Hf (hafnium), and Sn (tin)), P, and O, an ion conductor having a garnet-type crystal structure containing at least Li, Zr, La, and O, or a garnet-type similar structure, and an ion conductor having a perovskite-type structure containing at least Li, Ti, La, and O can be exemplified. That is, one type of these ion conductors may be used, or a plurality of types thereof may be used in combination. According to the laminated all-solid-state battery 100 according to the present embodiment, occurrence of cracks can be suppressed and cycle characteristics can be improved.

(Outer Layer)

The outer layer 4 is disposed on either one or both (both in FIG. 3) of regions on an outer side than either of the positive electrode layer 1 (positive electrode current collector layer 1A) and the negative electrode layer 2 (negative electrode current collector layer 2A) in a lamination direction. For the outer layer 4, the same materials as for the solid electrolyte layer A may be used. It is noted that, in the present embodiment, the lamination direction corresponds to a z direction in FIG. 3.

A thickness of the outer layer 4 is not particularly limited, but may be, for example, 20 μm or more and 100 μm or less. When the thickness is 20 μm or more, the positive electrode layer 1 or the negative electrode layer 2 closest to a surface of the laminate 20 in the lamination direction is less likely to be oxidized due to an influence of the atmosphere in a calcination process, resulting in a laminated all-solid-state battery having a high capacity. It is noted that, when the thickness is 100 μm or less, sufficient humidity resistance is secured even in an environment such as a high temperature and high humidity, and thereby an all-solid-state battery with high reliability and high volumetric energy density is obtained.

Second Embodiment

Figure 5:
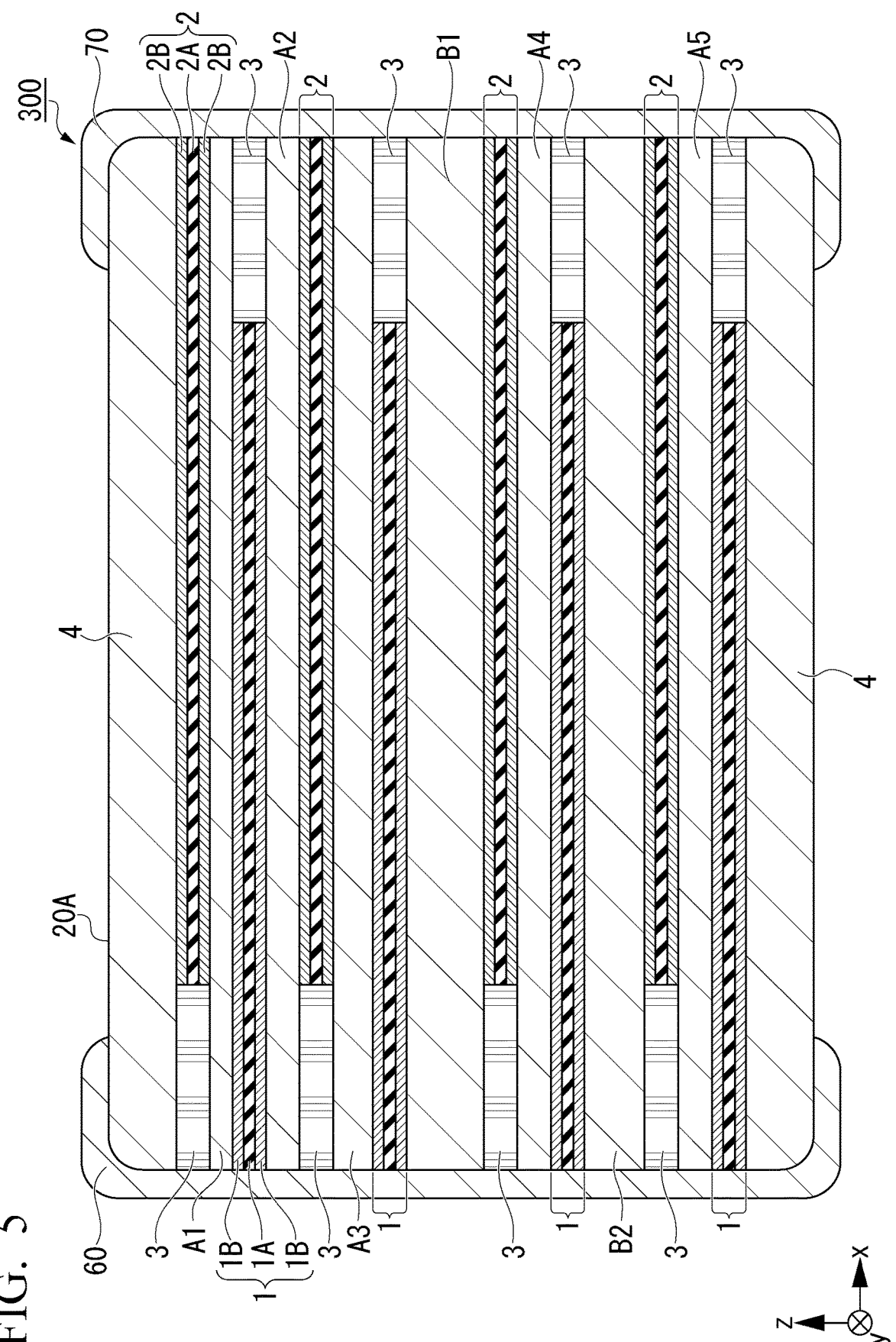
FIG. 5 is a cross-sectional view of a laminated all-solid-state battery according to a second embodiment of the present invention.

FIG. 5 is an enlarged schematic cross-sectional view of a main part of a laminated all-solid-state battery 300 according to a second embodiment. In the laminated all-solid-state battery 300, components the same as those of the laminated all-solid-state battery 100 may be denoted by the same reference signs, and description thereof may be omitted. Although details will be described later, in the laminated all-solid-state battery 300 according to the second embodiment, a thickness of a solid electrolyte layer is different from that of the laminated all-solid-state battery 100 according to the first embodiment.

The laminated all-solid-state battery 300 includes a laminate 20A, an outer positive electrode 60, and an outer negative electrode 70. The laminate 20A includes a positive electrode layer 1, a negative electrode layer 2, solid electrolyte layers A1 to A5, B1, and B2, and outer layers 4. The outer layers 4 sandwich the positive electrode layer 1, the negative electrode 2, and the solid electrolyte layers A1 to A5, B1, and B2 in a lamination direction. In the present embodiment, the positive electrode layer 1, the negative electrode layer 2, and the solid electrolyte layers A1 to A5, B1, and B2 sandwiched between the outer layers 4 may be collectively referred to as a power storage element.

The positive electrode layer 1 and the negative electrode layer 2 are electrode layers, either one of which functions as a positive electrode, and the other of which functions as a negative electrode. Whether each of the electrode layers is positive or negative is changed depending on which polarity is connected to an external terminal thereof. In the present embodiment, since the positive electrode layer 1 is connected to the outer positive electrode 60 and the negative electrode layer 2 is connected to the outer negative electrode 70, the positive electrode layer 1 functions as a positive electrode and the negative electrode layer 2 functions as a negative electrode.

The positive electrode layer 1 includes a positive electrode current collector layer 1A and a positive electrode active material layer 1B which contains a positive electrode active material. The negative electrode layer 2 includes a negative electrode current collector layer 2A and a negative electrode active material layer 2B which contains a negative electrode active material.

The positive electrode current collector layer 1A and the negative electrode current collector layer 2A have excellent conductivity. The positive electrode current collector layer 1A and the negative electrode current collector layer 2A are, for example, silver, palladium, gold, platinum, aluminum, copper, or nickel. Copper does not easily react with a positive electrode active material, a negative electrode active material, and a solid electrolyte. For example, when copper is used for the positive electrode current collector layer 1A and the negative electrode current collector layer 2A, an internal resistance of the laminated all-solid-state battery 300 can be reduced. Materials forming the positive electrode current collector layer 1A and the negative electrode current collector layer 2A may be the same or different from each other.

The positive electrode active material layer 1B is formed on one side or both sides of the positive electrode current collector layer 1A. On a surface of the positive electrode current collector layer 1A on a side in which there is no negative electrode layer 2 to face, the positive electrode active material layer 1B may not be present. The negative electrode active material layer 2B is formed on one side or both sides of the negative electrode current collector layer 2A. On a surface of the negative electrode current collector layer 2A on a side in which there is no positive electrode layer 1 to face, the negative electrode active material layer 2B may not be present. For example, the positive electrode layer 1 or the negative electrode layer 2 positioned at an uppermost layer or a lowermost layer of the laminate 5 may not have the positive electrode active material layer 1B or the negative electrode active material layer 2B on one side.

The positive electrode active material layer 1B and the negative electrode active material layer 2B according to the present embodiment contain known materials at least capable of absorbing and desorbing lithium ions as the positive electrode active material and the negative electrode active material. In addition, a conductive auxiliary agent, an ion-conductive auxiliary agent, or the like may be contained. It is preferable that the positive electrode active material and the negative electrode active material can efficiently absorb and desorb lithium ions.

The positive electrode current collector layer 1A and the negative electrode current collector layer 2A may respectively contain a positive electrode active material and a negative electrode active material. A content ratio of the active material contained in each current collector is not particularly limited as long as the current collector performs its own function. For example, a volume ratio of positive electrode current collector/positive electrode active material or negative electrode current collector/negative electrode active material is preferably in a range of 90/10 to 70/30.

The solid electrolyte layers A1 to A5, B1, and B2 are positioned between the positive electrode active material layer 1B and the negative electrode active material layer 2B in the lamination direction. The solid electrolyte layers A1 to A5, B1, and B2 contain solid electrolytes. The solid electrolyte is a material (for example, particles) capable of moving ions by an electric field applied from the outside. For example, lithium ions move in the solid electrolyte by an electric field applied from the outside. The solid electrolyte is an insulator that hinders movement of electrons.

The solid electrolyte layers A1 to A5, B1, and B2 of the laminated all-solid-state battery 300 of the present embodiment are not particularly limited, and may include a solid electrolyte layer having a crystal structure of any one selected from the group consisting of, for example, a NASICON-type, a garnet-type, a perovskite-type, and a LISICON-type crystal structures. As the solid electrolyte material, at least one type of an ion conductor (for example, $Li_{1+x}Al_xTi_{2-x}(PO_4)_3$; LATP) having a NASICON-type crystal structure containing at least Li (lithium), M (M is at least one of Ti (titanium), Zr (zirconium), Ge (germanium), Hf (hafnium), and Sn (tin)), P (phosphorus), and O (oxygen), an ion conductor (for example, $Li_7La_3Zr_2O_{12}$; LLZ) having a garnet-type crystal structure containing at least Li (lithium), Zr (zirconium), La (lanthanum), and O (oxygen) or an ion conductor having a garnet-type similar structure, an ion conductor (for example, $Li_{3x}La_{2/3-x}TiO_3$; LLTO) having a perovskite-type structure containing at least Li (lithium), Ti (titanium), La (lanthanum), and O (oxygen), and a lithium ion conductor (for example, $Li_{3.5}Si_{0.5}P_{0.5}O_{3.5}$: LSPO) having a LISICON-type crystal structure containing at least Li, Si, P, and O can be exemplified. That is, one type of these ion conductors may be used, or two or more types thereof may be used in combination.

Thicknesses of the solid electrolyte layers A1 to A5, B1, and B2 are each in a range of, for example, 0.5 μm or more and 20.0 μm or less. When the thicknesses of the solid electrolyte layers A1 to A5 are each set to 0.5 μm or more, short-circuiting between the positive electrode layer 1 and the negative electrode layer 2 can be reliably prevented, and when the thicknesses are each set to 20.0 μm or less, since a moving distance of lithium ions is reduced, an internal resistance of the laminated all-solid-state battery can be reduced.

The solid electrolyte layers A1 to A5 belong to a first group. The solid electrolyte layer A1 is a solid electrolyte layer having a smallest thickness among the solid electrolyte layers A1 to A5, B1, and B2. A thickness of each of the solid electrolyte layers A2 to A5 is one times or more and less than two times the thickness of the solid electrolyte layer A1.

The solid electrolyte layers B1 and B2 belong to a second group. Thicknesses of the solid electrolyte layers B1 and B2 are at least twice the thickness of the solid electrolyte layer A1. The number of the solid electrolyte layers belonging to the second group is at least one arbitrary number.

Disposition of the solid electrolyte layer belonging to the second group is arbitrarily selected. For example, when the number of the solid electrolyte layers belonging to the second group is one, the disposition may be configured so that the number of the solid electrolyte layers belonging to the first group sandwiched between the outer layer 4 on an upper side in the lamination direction and the solid electrolyte layer belonging to the second group closest to the outer layer 4 on the upper side in the lamination direction is equal to the number of the solid electrolyte layers belonging to the first group sandwiched between the outer layer 4 on a lower side in the lamination direction and the solid electrolyte layer belonging to the second group closest to the outer layer 4 on the lower side in the lamination direction. That is, the disposition may be configured so that the number of the solid electrolyte layers belonging to the first group on an upper side of the solid electrolyte layer belonging to the second group in the lamination direction is equal to the number of the solid electrolyte layers belonging to the first group on a lower side thereof in the lamination direction. When the number of the solid electrolyte layers belonging to the second group is two or more, the disposition may be configured so that the number of the solid electrolyte layers belonging to the first group sandwiched between the outer layer 4 on the upper side in the lamination direction and the solid electrolyte layer belonging to the second group closest to the outer layer 4 on the upper side in the lamination direction, the number of the solid electrolyte layers belonging to the first group sandwiched between the outer layer 4 on the lower side in the lamination direction and the solid electrolyte layer belonging to the second group closest to the outer layer 4 on the lower side in the lamination direction, and the number of the solid electrolyte layers belonging to the first group sandwiched between adjacent solid electrolyte layers belonging to the second group are equal to each other.

An average thickness $t_a$ of the solid electrolyte layers A1 to A5 belonging to the first group and an average thickness $t_b$ of the solid electrolyte layers B1 and B2 belonging to the second group satisfy the following expression (1).

$$2t_a \leq t_b \tag{1}$$

The average thickness $t_a$ of the solid electrolyte layers A1 to A5 belonging to the first group and the average thickness $t_b$ of the solid electrolyte layers B1 and B2 belonging to the second group may satisfy the following expression (2).

$$2t_a \leq t_b \leq 10t_a \tag{2}$$

In the present embodiment, a solid electrolyte layer having the smallest thickness among all the solid electrolyte layers, such as the solid electrolyte layer A1, may be referred to as a first solid electrolyte layer. In the present embodiment, a solid electrolyte layer having a thickness of twice or more the thickness of the first solid electrolyte layer, such as the solid electrolyte layers B1 and B2, may be referred to as a second solid electrolyte layer. In the present embodiment, a solid electrolyte layer having a thickness larger than and twice or less that of the first solid electrolyte layer, such as the solid electrolyte layers A2 to A5, may be referred to as a third solid electrolyte layer.

Also in the laminated all-solid-state battery 300 according to the present embodiment, the same effects as those of the laminated all-solid-state battery 100 according to the first embodiment can be obtained.

It is noted that, in the present embodiment, an example in which the thicknesses of the solid electrolyte layers A1 to A5 belonging to the first group and the thicknesses of the solid electrolyte layers B1 and B2 belonging to the second group are different has been illustrated, but they may be the same as each other.

In the present embodiment, a case in which five layers of the solid electrolyte layers A1 to A5 has been exemplified as the solid electrolyte layers belonging to the first group, but the number of the solid electrolyte layers belonging to the first group is an arbitrarily number of two or more. In the present embodiment, a case in which two layers of the solid electrolyte layers B1 and B2 has been exemplified as the solid electrolyte layers belonging to the second group, but the number of the solid electrolyte layers belonging to the second group is an arbitrarily number of one or more.

It is noted that, in the present embodiment, a case in which there is one first solid electrolyte layer has been exemplified. However, it may be configured such that at least one of the solid electrolyte layers A2 to A5 is the same as the solid electrolyte layer A1, and there are a plurality of first solid electrolyte layers.

(Manufacturing Method of Laminated All-Solid-State Battery)

The laminated all-solid-state battery 100 of the present embodiment can be manufactured by the following procedure. Each material of the positive electrode current collector layer 1A, the positive electrode active material layer 1B, the solid electrolyte layer A, the solid electrolyte layer B, the negative electrode current collector layer 2A, the negative electrode active material layer 2B, and the side margin layer 3 is made into a paste. A method of making each material into a paste is not particularly limited, and for example, powders of each material can be mixed with a vehicle to obtain a paste. Here, the vehicle refers to a collective term for a medium in a liquid phase, and a solvent, a binder, and the like are included therein. A binder contained in a paste for forming a green sheet or a printing layer is not particularly limited, but a polyvinyl acetal resin, a cellulose resin, an acrylic resin, an urethane resin, a vinyl acetate resin, a polyvinyl alcohol resin, or the like can be used, and at least one of these resins can be contained in a slurry.

The paste may contain a plasticizer. Types of the plasticizer are not particularly limited, but phthalates such as dioctyl phthalate and diisononyl phthalate, or the like may be utilized.

By such a method, a positive electrode current collector layer paste, a positive electrode active material layer paste, a solid electrolyte layer paste, a negative electrode active material layer paste, a negative electrode current collector layer paste, and a side margin layer paste are made.

The manufactured solid electrolyte layer paste is applied on a substrate such as polyethylene terephthalate (PET) to a desired thickness and is dried as necessary to make a green sheet for a solid electrolyte (solid electrolyte layer A). Also in the solid electrolyte layer B having a thickness larger than that of the solid electrolyte layer A, the green sheet for a solid electrolyte (solid electrolyte layer B) is made by the same procedure.

A method of making the green sheet for a solid electrolyte is not particularly limited, and known methods such as a doctor blade method, a die coater, a comma coater, and a gravure coater can be employed.

Next, the positive electrode active material layer 1B, the positive electrode current collector layer 1A, and the positive electrode active material layer 1B are printed and laminated in order on the green sheet for a solid electrolyte (solid electrolyte layer A) by screen printing to form the positive electrode layer 1. Next, in order to fill a step between the green sheet for a solid electrolyte (solid electrolyte layer A) and the positive electrode layer 1, the side margin layer 3 is formed by screen printing in a region other than the positive electrode layer 1 to make a positive electrode unit (one in which the positive electrode layer 1 and the side margin layer 3 are formed on the solid electrolyte layer A).

The negative electrode unit can also be made through the same method as that of the positive electrode unit.

Then, the positive electrode unit and the negative electrode unit are laminated while being alternately offset so that one end of the positive electrode and one end of the negative electrode do not overlap each other. After lamination is made to a predetermined number of layers, the solid electrolyte layer B having a thickness larger than that of the solid electrolyte layer A is laminated. Next, the positive electrode unit and the negative electrode unit are similarly laminated to a predetermined number of layers again, and thereby a laminated substrate constituted by the elements of the laminated all-solid-state battery is made. It is noted that, outer layers can be provided on the laminated substrate on both main surfaces of the laminate as necessary. The same material as the solid electrolyte layer can be used for the outer layers, and for example, the green sheet for a solid electrolyte can be used. The solid electrolyte layer B may have only one layer, or may have a plurality of layers (a plurality of positions). The solid electrolyte layer B is preferably provided to divide the number of laminations of the elements into equal parts or substantially equal parts. For example, when one solid electrolyte layer B is provided in a laminate having the number of laminations of 31, one solid electrolyte layer B may be provided at a 16th layer. In this case, a laminated all-solid-state battery in which the laminate has a configuration of 15 layers/15 layers with the solid electrolyte layer B interposed therebetween can be obtained. Similarly, when two solid electrolyte layers B (at two positions) are provided, the solid electrolyte layers B may be provided at an 11th layer and a 21st layer, respectively. In this case, a laminated all-solid-state battery in which the laminate has a configuration of 10 layers/9 layers/10 layers with each solid electrolyte layer B interposed therebetween can be obtained.

A lamination position at which the solid electrolyte layer B is provided is not necessary to divide the number of laminations into equal parts or substantially equal parts, and at least the solid electrolyte layer B having a large thickness need only be provided at any position of laminations. When the solid electrolyte layer B is provided, volume expansion of the laminated all-solid-state battery can be dispersed.

The manufacturing method described above is for manufacturing the laminated all-solid-state battery 100 of a parallel type, and in a manufacturing method for a laminated all-solid-state battery of a series type, the lamination may be made so that one end of the positive electrode and one end of the negative electrode match each other, that is, without them being offset.

Further, the manufactured laminated substrate can be collectively pressed by a die press, a hot water isotropic pressure press (WIP), a cold water isotropic pressure press (CIP), a hydrostatic pressure press, or the like to improve the adhesion. Pressurization is preferably performed while heating, and can be performed, for example, at 40 to 95° C.

The manufactured laminated substrate can be cut into the laminate 10 of an uncalcined laminated all-solid-state battery using a dicing device.

The laminate 10 is sintered by debinding and calcining the laminate 10 of the laminated all-solid-state battery. In the debinding and calcination, the calcination can be performed at a temperature of 600° C. to 1000° C. in a nitrogen atmosphere. A retaining time for the debinding and calcination is, for example, 0.1 to 6 hours.

Barrel polishing is performed by chamfering corners of the laminate for the purpose of preventing chipping and for exposing an end surface of the current collector layer. The barrel polishing may be performed on the laminate 10 of the uncalcined all-solid-state battery, or may be performed on the laminate 10 after calcination. Barrel polishing methods include dry barrel polishing without water and wet barrel polishing with water. When wet barrel polishing is performed, an aqueous solution such as water is separately supplied to a barrel polishing machine.

Conditions for barrel processing are not particularly limited, can be adjusted as appropriate, and may be performed within a range in which defects such as cracking and chipping do not occur in the laminate.

Further, outer electrodes (the outer positive electrode 60 and the outer negative electrode 70) can be provided to efficiently draw a current from the laminate 10 of the laminated all-solid-state battery. The outer electrodes are configured so that the outer positive electrode 60 and the outer negative electrode 70 are each formed on any of a pair of facing side surfaces of the laminate 10. As a method of forming the outer electrode, a sputtering method, a screen printing method, a dip coating method, or the like can be exemplified. In the screen printing method and the dip coating method, an outer electrode paste containing a metal powder, a resin, and a solvent is made to be formed as an outer electrode. Next, a baking process for removing the solvent and a plating treatment for forming a terminal electrode on a surface of the outer electrode are performed. On the other hand, in the sputtering method, the outer electrode and the terminal electrode can be directly formed, and thus the baking process and the plating treatment are not required.

The laminate 10 of the laminated all-solid-state battery described above may be sealed in, for example, a coin cell to enhance humidity resistance and impact resistance. A sealing method thereof is not particularly limited, and for example, the laminate after calcination may be sealed with a resin. An insulator paste having an insulating property such as $Al_2O_3$ may be applied or dip-coated around the laminate, and the insulator paste may be heat-treated for the sealing.

In the above-described embodiment, a manufacturing method of a laminated all-solid-state battery having a process of forming a side margin layer using the side margin layer paste has been exemplified, but the manufacturing method of a laminated all-solid-state battery according to the present embodiment is not limited to the example. For example, the process of forming the side margin layer using the side margin layer paste may be omitted. The side margin layer may be formed by, for example, deforming the solid electrolyte layer paste in the manufacturing process of the laminated all-solid-state battery.

While the embodiments according to the present invention have been described in detail above, the present invention is not limited to the above-described embodiments and various modifications can be made.

EXAMPLES

Hereinafter, the present invention will be described in more detail using examples and comparative examples on the basis of the above-described embodiments, but the present invention is not limited to these examples. It is noted that, "parts" denoted in an input amount of a material in manufacturing a paste means "parts by mass" unless otherwise specified.

Example 1

(Manufacture of Positive Electrode Active Material and Negative Electrode Active Material)

A positive electrode active material and a negative electrode active material were made by the following procedure. Using $Li_2CO_3$, $V_2O_5$ and $NH_4H_2PO_4$ as starting materials, wet-mixing was performed with a ball mill for 16 hours, and this mixed one was dehydrated and dried. The obtained powder was calcined at 850° C. for two hours in a nitrogen-hydrogen mixed gas, wet-pulverized with the ball mill again for 16 hours after the calcination, and finally dehydrated and dried to obtain powders of the positive electrode active material and the negative electrode active material.

As a result of X-ray diffraction (XRD) measurement and inductively coupled plasma (ICP) emission spectroscopy analysis for the obtained active material, it was ascertained that the active material was vanadium lithium phosphate of $Li_3V_2(PO_4)_3$. In identification for an X-ray diffraction pattern thereof, JCPDS card 74-3236: $Li_3V_2(PO_4)_3$ was referred to.

(Manufacture of Positive Electrode Active Material Paste and Negative Electrode Active Material Paste)

A positive electrode active material paste and a negative electrode active material paste were made by adding 15 parts of ethyl cellulose as a binder and 65 parts of dihydroterpineol as a solvent to 100 parts of powders of the positive electrode active material and the negative electrode active material obtained above, and mixing and dispersing them.

(Manufacture of Solid Electrolyte Paste)

A solid electrolyte was made by the following procedure. Using $Li_2CO_3$ (lithium carbonate), $TiO_2$ (titanium oxide), $Al_2O_3$ (aluminum oxide) and $NH_4H_2PO_4$ (ammonium dihydrogen phosphate) as starting materials, each material was weighed so that a molar ratio of Li, Al, Ti, and $PO_4$ was 1.3:0.3:1.7:3.0 (=Li:Al:Ti:$PO_4$). These were wet-mixed with a ball mill for 16 hours and then dehydrated and dried. The obtained powder was calcined at 800° C. for two hours in the atmosphere, wet-pulverized with the ball mill again for 16 hours after the calcination, and finally dehydrated and dried to obtain a powder of the solid electrolyte.

As a result of analyzing the obtained powder of the solid electrolyte with an XRD device and an ICP emission spectroscope, it was ascertained that the powder of the solid electrolyte was $Li_{1.3}Al_{0.3}Ti_{1.7}(PO_4)_3$ (aluminum titanium lithium phosphate) having a NASICON-type crystal structure. In identification for an X-ray diffraction pattern thereof, JCPDS card 35-0754: $LiTi_2(PO_4)_3$ was referred to.

100 parts of ethanol and 200 parts of toluene as solvents were added to 100 parts of the powder of the solid electrolyte, and this was wet-mixed with a ball mill. Thereafter, 16 parts of a polyvinyl butyral-based binder and 4.8 parts of benzyl butyl phthalate were added and wet-mixed with a ball mill to make a solid electrolyte paste.

(Manufacture of Solid Electrolyte Layer Sheet)

A sheet of the solid electrolyte layer A was made by applying the solid electrolyte paste onto a PET film using a doctor blade-type sheet molding machine. Further, a plurality of sheets of the solid electrolyte layer B having a thickness of 1 to 15 times the thickness of the solid electrolyte layer A were also made by the same procedure.

(Manufacture of Positive Electrode Current Collector Paste and Negative Electrode Current Collector Paste)

As a positive electrode current collector and a negative electrode current collector, Cu powder and the manufactured powders of the positive electrode active material and the negative electrode active material were mixed to have a volume ratio of 80/20, thereafter 10 parts of ethyl cellulose as a binder and 50 parts of dihydroterpineol as a solvent were added to 100 parts of the mixture, and mixed and dispersed to make a positive electrode current collector layer paste and a negative electrode current collector layer paste.

(Manufacture of Outer Electrode Paste)

A Cu powder, an epoxy resin, and a solvent were mixed and dispersed with a ball mill to make an outer electrode paste of a thermosetting type.

Using the sheet of the solid electrolyte layer A, the sheet of the solid electrolyte layer B, the positive electrode current collector paste, the negative electrode current collector paste, and the outer electrode paste, a laminated all-solid-state battery was made by the following procedure.

(Manufacture of Positive Electrode Unit)

A positive electrode active material layer was printed and formed on a part of a main surface of the sheet of the solid electrolyte layer A using a screen printing machine, and dried at 80° C. for 10 minutes. A positive electrode current collector layer was printed and formed on the positive electrode active material layer, and dried at 80° C. for 10 minutes. Further, a positive electrode active material layer was printed and formed on the positive electrode current collector layer and dried at 80° C. for 10 minutes, and thereby a positive electrode layer in which the positive electrode current collector layer was sandwiched between the positive electrode active material layers was formed on a part of the main surface of the sheet of the solid electrolyte layer A. Next, a solid electrolyte layer having substantially the same height as the positive electrode layer was printed and formed on the main surface of the sheet of the solid electrolyte layer A in which the positive electrode layer was not printed and formed, and dried at 80° C. for 10 minutes.

Next, when the PET film was peeled off, a positive electrode unit in which the positive electrode layer and the solid electrolyte layer were printed and formed on the main surface of the solid electrolyte layer A was made.

(Manufacture of Negative Electrode Unit)

A negative electrode unit was made by the same procedure as the positive electrode unit.

(Manufacture of Laminated All-Solid-State Battery)

The positive electrode unit and the negative electrode unit were laminated with one end of the positive electrode layer and one end of the negative electrode layer shifted from each other. At this time, the positive electrode unit and the negative electrode unit were alternately laminated in that order. When a solid electrolyte layer sandwiched between the positive electrode layer and the negative electrode layer was used as one layer, lamination was made until the number of the layers was 15. When, when 15 layers are laminated, it is a state in which the negative electrode layer is laminated as an uppermost layer. Next, one layer of the sheet of the solid electrolyte layer B having a thickness twice that of the solid electrolyte layer A was laminated on the above-described negative electrode layer as a 16th solid electrolyte layer. Next, the positive electrode unit was vertically inverted and laminated so that the positive electrode layer was laminated on the solid electrolyte layer B. Next, the negative electrode unit was also vertically inverted and laminated, 15 layers were laminated with one end of the positive electrode layer and one end of the negative electrode layer shifted from each other in the same manner as described above, and thereby a laminated substrate including a total of 31 layers having the solid electrolyte layers A (15 layers), the solid electrolyte layer B (1 layer), and the solid electrolyte layers A (15 layers) was made in order in the lamination direction.

A plurality of sheets of the solid electrolyte layer A were laminated on an upper surface and a lower surface of the laminated substrate, and outer layers formed of the solid electrolyte layer were provided. It is noted that, thicknesses of the outer layers provided on the upper surface and the lower surface were formed to be the same.

Laminated chips were made by cutting the laminated substrate after it was thermocompression-bonded by a die press to enhance adhesion at each laminated interface. Next, the laminated chips were placed on a ceramic setter and held at 600° C. for two hours in a nitrogen atmosphere for debinding. Next, the laminated chips were calcined by being held at 750° C. for two hours in a nitrogen atmosphere and were taken out after natural cooling.

(Outer Electrode Forming Process)

An outer electrode paste of Cu was applied to an end surface of each of the laminated chips after the calcination, was held at 150° C. for 30 minutes to be thermally cured to form an outer electrode, and thereby a laminated all-solid-state battery according to example 1 was made.

(Evaluation of Thickness of Solid Electrolyte Layer)

An average thickness $t_a$ of the solid electrolyte layers A and a thickness $t_b$ of the solid electrolyte layers B of the laminated all-solid-state battery according to example 1 were calculated by an image analysis after a laminated cross-sectional image of the all-solid-state battery was acquired by a field emission scanning electron microscope (FE-SEM). A straight line perpendicular to the positive electrode active material layer 1B or the negative electrode active material layer 2B positioned at an end in the lamination direction was drawn, and on the straight line, a length between the positive electrode active material layer 1B and the negative electrode active material layer 2B adjacent to each other was defined as a thickness of the solid electrolyte layer sandwiched between the positive electrode active material layer 1B and the negative electrode active material layer 2B adjacent to each other. In the present embodiment, the thickness of the solid electrolyte layer refers to a thickness of the solid electrolyte layer at a center of the laminate 20 in a width direction. Here, the width direction of the laminate is a direction in which the laminate 20 is sandwiched between the outer positive electrode 60 and the outer negative electrode 70, and refers to an x direction in FIG. 3. As a result of measuring thicknesses of all the solid electrolyte layers A and calculating an average thickness of the solid electrolyte layers A, $t_a$ was 5 μm. Similarly, as a result of calculating an average thickness of the solid electrolyte layers B, $t_b$ was 10 μm. An average thickness ratio $t_b/t_a$ was 2. The results were shown in Table 1.

Comparative Example 1

A laminated all-solid-state battery according to comparative example 1 is different from that of example 1 only in that the 16th solid electrolyte layer B has the same configuration as the solid electrolyte layer A. That is, as the 16th solid electrolyte layer of the laminated all-solid-state battery according to comparative example 1, a sheet having a thickness one times that of the solid electrolyte layer A was laminated. In the laminated all-solid-state battery according to comparative example 1, a plurality of solid electrolyte layers are composed of only the solid electrolyte layers belonging to the first group, and do not have the solid electrolyte layer belonging to the second group.

Comparative Examples 2 and 3

Laminated all-solid-state batteries according to comparative examples 2 and 3 are different from that of example 1 only in that the 16th solid electrolyte layer B is changed to a solid electrolyte layer B'. In comparative examples 2 and 3, sheets having thicknesses of 1.2 times and 1.6 times the thickness of the solid electrolyte layer A of example 1 were respectively laminated as the solid electrolyte layers B'. Therefore, in the laminated all-solid-state batteries according to comparative examples 2 and 3, a plurality of solid electrolyte layers are composed of only the solid electrolyte layers belonging to the first group, and do not have the solid electrolyte layer belonging to the second group. Hereinafter, for convenience of description, in comparative examples 2 and 3, the solid electrolyte layer laminated in place of the 16th solid electrolyte layer B of example 1 is referred to as the solid electrolyte layer B', and the other solid electrolyte layers are referred to as the solid electrolyte layer A'. Also, an average thickness of the solid electrolyte layers A' and a thickness (average thickness) of the solid electrolyte layer B' are referred to as $t_a'$ and $t_b'$, respectively. Regarding other conditions, the laminated all-solid-state battery was made by the same procedure as in example 1, and $t_a'$, $t_b'$, and $t_b'/t_a'$ were also measured by the same procedure as in example 1.

Examples 2, 3, 4, and 5

In laminated all-solid-state batteries according to examples 2, 3, 4, and 5, the laminated all-solid-state batteries were each made by the same procedure as in example 1 except that sheets of the solid electrolyte layers B having thicknesses of 3 times, 6 times, 10 times, and 15 times the thickness of the solid electrolyte layer A were respectively laminated as the 16th solid electrolyte layers B, and $t_a$, $t_b$, and $t_b/t_a$ thereof were also measured by the same procedure as in example 1.

Examples 6, 7, and 8

In laminated all-solid-state batteries according to examples 6, 7, and 8, the laminated all-solid-state batteries were each made by the same procedure as in example 2 except that a solid electrolyte material in the 16th solid electrolyte layer B was changed to LTP, LAGP, or LYZP having a NASICON-type crystal structure, and $t_a$, $t_b$, and $t_b/t_a$ thereof were measured by the same procedure as in example 1. The solid electrolytes of LTP, LAGP and LYZP were made by the following synthesis methods.

LTP was made by the same synthesis method as in example 1 by using $Li_2CO_3$ (lithium carbonate), $TiO_2$ (titanium oxide), and $NH_4H_2PO_4$ (ammonium dihydrogen phosphate) as starting materials, and weighing each material so that a molar ratio of Li, Ti, and $PO_4$ was 1.0:2.0:3.0 (=Li:Ti:$PO_4$). It was ascertained from XRD measurement and an ICP analysis that the obtained solid electrolyte was $LiTi_2(PO_4)_3$.

LAGP was made by the same synthesis method as in example 1 except that the starting material was changed to $GeO_2$ instead of $TiO_2$, and a molar ratio of Li, Al, Ge, and $PO_4$ was weighed to be 1.3:0.3:1.7:3.0 (=Li:Al:Ge:$PO_4$). It was ascertained from XRD measurement and an ICP analysis that the obtained solid electrolyte was $Li_{1.3}Al_{0.3}Ge_{1.7}(PO_4)_3$.

LYZP was made by the same synthesis method as in example 1 by using $Li_2CO_3$ (lithium carbonate), $Y(NO_3)_3$ (yttrium nitrate), $ZrO(NO_3)_2 \cdot 2H_2O$ (zirconium oxynitrate), and $NH_4H_2PO_4$ (ammonium dihydrogen phosphate) as starting materials, and weighing Li, Y, Zr, and $PO_4$ to have a molar ratio of 1.1:0.1:1.9:3.0 (=Li:Y:Zr:$PO_4$). It was ascertained from XRD measurement and an ICP analysis that the obtained solid electrolyte was $Li_{1.3}Y_{0.3}Zr_{1.7}(PO_4)_3$.

Examples 9 and 10

In laminated all-solid-state batteries according to examples 9 and 10, the laminated all-solid-state batteries were each made by the same procedure as in example 2 except that the solid electrolyte materials of the solid electrolyte layer A and the solid electrolyte layer B were changed to $Li_7La_3Zr_2O_{12}$ (LLZ) having a garnet-type crystal structure and $Li_{0.3}La_{0.55}TiO_3$ (LLTO) having a perovskite-type crystal structure, and $t_a$, $t_b$, and $t_b/t_a$ thereof were measured by the same procedure as in example 1. The solid electrolytes of LLZ and LLTO were made by the following synthesis methods.

LLZ was made by the same synthesis method as in example 1 by using $Li_2CO_3$ (lithium carbonate), $La_2O_3$ (lanthanum oxide), and $ZrO_2$ (zirconium oxide) as starting materials, and weighing a molar ratio of Li, La, and Zr to be 7:3:2 (=Li:La:Zr). It was ascertained from XRD measurement and an ICP analysis that the obtained solid electrolyte was $Li_7La_3Zr_2O_{12}$.

LLTO was made by the same synthesis method as in example 1 by using $Li_2CO_3$ (lithium carbonate), $La_2O_3$ (lanthanum oxide), and $TiO_2$ (titanium oxide) as starting materials, and weighing a molar ratio of Li, La, and Ti to be 0.3:0.55:1.0 (=Li:La:Ti). It was ascertained from XRD measurement and an ICP analysis that the obtained solid electrolyte was $Li_{0.3}La_{0.55}TiO_3$.

Example 11

In a laminated all-solid-state battery according to the example 11, the laminated all-solid-state battery was made by the same procedure as in example 2 except that the solid electrolyte material in the 16th solid electrolyte layer B was changed to a mixture of LATP and LAGP in a weight ratio of 50:50, and $t_a$, $t_b$, and $t_b/t_a$ thereof were measured by the same procedure as in example 1.

Example 12

In a laminated all-solid-state battery according to example 12, the laminated all-solid-state battery was made by the same procedure as in example 2 except that the solid electrolyte material in the solid electrolyte layer B was changed to $Li_7La_3Zr_2O_{12}$ (LLZ) having a garnet-type crystal structure, and $t_a$, $t_b$, and $t_b/t_a$ thereof were measured by the same procedure as in example 1.

Example 13

In a laminated all-solid-state battery according to example 13, the laminated all-solid-state battery was made by the same procedure as in example 2 except that the sheet of the solid electrolyte layer B in example 2 was laminated on the 11th layer and the 21st layer, and $t_a$, $t_b$, and $t_b/t_a$ thereof were measured by the same procedure as in example 1.

Example 14

In a laminated all-solid-state battery according to example 14, the laminated all-solid-state battery was made by the same procedure as in example 2 except that the sheet of the solid electrolyte layer B in example 2 was laminated on the 14th layer, and $t_a$, $t_b$, and $t_b/t_a$ thereof were measured by the same procedure as in example 1.

Example 15

In a laminated all-solid-state battery according to example 15, the laminated all-solid-state battery was made by the same procedure as in example 2 except that the solid electrolyte materials of the solid electrolyte layer A and the solid electrolyte layer B were changed to $Li_{3.5}Si0.5P_{0.5}O_4$ (LSPO), and $t_a$, $t_b$, and $t_b/t_a$ thereof were measured by the same procedure as in example 1. The solid electrolyte of LSPO was made by the following synthesis method.

LSPO was made by using $Li_2CO_3$, $SiO_2$ and commercially available $Li_3PO_4$ as starting materials, weighing them so that a molar ratio was 2:1:1, wet-mixing them with water as a dispersion medium by a ball mill for 16 hours, and then dehydrating and drying them. The obtained powder was calcined at 950° C. for two hours in the atmosphere, wet pulverized again with the ball mill for 16 hours, and finally dehydrated and dried to obtain a powder of the solid electrolyte. It was ascertained from the results of XRD measurement and an ICP analysis that the above-described powder was $Li_{3.5}Si_{0.5}P_{0.5}O_4$ (LSPO).

Examples 16 and 17

In a laminated all-solid-state battery according to example 16, the laminated all-solid-state battery was made by the same procedure as in example 1 except that sheets of the solid electrolyte layers B1 and B2 having thicknesses twice and 6 times the thickness of the solid electrolyte layer A were laminated as the 11th and 21st solid electrolyte layers B (B1 and B2), and $t_a$, $t_b$, and $t_b/t_a$ thereof were also measured by the same procedure as in example 1.

In a laminated all-solid-state battery according to example 17, the laminated all-solid-state battery was made by the same procedure as in example 1 except that sheets of the solid electrolyte layers B1 and B2 having thicknesses twice and 10 times the thickness of the solid electrolyte layer A were laminated as the 11th and 21st solid electrolyte layers B (B1 and B2), and $t_a$, $t_b$, and $t_b/t_a$ thereof were also measured by the same procedure as in example 1.

Example 18

In the laminated all-solid-state battery according to example 18, sheets of the solid electrolyte layers having different thicknesses were respectively laminated as the 1st to 10th solid electrolyte layers A, the 12th to 20th solid electrolyte layers A, and the 22nd to 31st solid electrolyte layers A. It is noted that, the solid electrolyte layers were adjusted so that the 1st to 10th solid electrolyte layers, the 12th to 20th solid electrolyte layers, and the 22nd to 31st solid electrolyte layers were disposed in ascending order of thickness. Sheets of the solid electrolyte layers B1 and B2 having thicknesses twice the average thickness of the solid electrolyte layers A were laminated as the 11th and 21st solid electrolyte layers B (B1 and B2). Regarding other conditions, the laminated all-solid-state battery was made in the same manner as in example 1 under the same conditions as in example 1, and $t_a$, $t_b$, and $t_b/t_a$ were also measured by the same procedure as in example 1.

Comparative Example 4

In the laminated all-solid-state battery according to comparative example 4, sheets of the solid electrolyte layers having different thicknesses were respectively laminated as the 1st to 10th solid electrolyte layers A, the 12th to 20th solid electrolyte layers A, and the 22nd to 31st solid electrolyte layers A. The solid electrolyte layers were adjusted to be the 1st to 10th solid electrolyte layers, the 12th to 20th solid electrolyte layers, and the 22nd to 31st solid electrolyte layers in ascending order of thickness. In comparative example 4, sheets of the solid electrolyte layers B1' and B2' having thicknesses of 1.5 times the average thickness of the solid electrolyte layer A were respectively laminated as the $11^{th}$ and 21st solid electrolyte layers B' (B1' and B2'). Regarding other conditions, the laminated all-solid-state battery was made in the same manner as in example 1 under the same conditions as in example 1, and $t_a'$, $t_b'$, and $t_b'/t_a'$ thereof were also measured by the same procedure as in example 1.

(Battery Evaluation)

The laminated all-solid-state batteries made in the present examples and comparative examples can be evaluated for the following battery characteristics.

[Charge/Discharge Cycle Test]

An outer negative terminal and an outer positive terminal of the laminated all-solid-state battery made in each of the present examples and the comparative examples were sandwiched between measuring probes, and charging and discharging were repeated, for example, under the charging/discharging conditions shown below.

In an environment of 25° C., constant-current charging (CC charging) was performed until the battery voltage reached 1.6 V at a constant current of 0.2 C rate, and then the battery was discharged until the battery voltage reached 0 V at a constant current of 0.2 C rate (CC discharge). The charging and discharging described above were regarded as one cycle, and a discharge capacity retention rate after repeating that up to 1000 cycles was evaluated as charge/discharge cycle characteristics. It is noted that, the charge/discharge cycle characteristics in the present embodiment were calculated by the following expression (1).

$$\text{Discharge capacity retention rate after 1000 cycles (\%)} = (\text{Discharge capacity after 1000 cycles/Discharge capacity after 1 cycle}) \times 100 \tag{1}$$

[Volume Expansion Coefficient]

In the charge/discharge cycle test, a thickness of the laminated all-solid-state battery before charging and a thickness of the laminated all-solid-state battery after a first charging were measured, and a volume expansion coefficient was calculated by the following expression (2).

$$\text{Volume expansion coefficient (\%)} = (\text{thickness of laminated all-solid-state battery at the time of first charging (mm)/thickness of laminated all-solid-state battery before charging (mm)}) \times 100 \tag{2}$$

Result

Table 1 shows the average thickness $t_a$ of the solid electrolyte layer A, the average thickness $t_b$ of the solid electrolyte layer B, the average thickness ratio $t_a/t_b$, a volume expansion coefficient, and a result of charge/discharge cycle test of each of the laminated all-solid-state batteries according to examples 1 to 15 and comparative example 1. Table 2 shows the average thickness $t_a'$ of the solid electrolyte layer A', the average thickness $t_b'$ of the solid electrolyte layer B', the average thickness ratio $t_a'/t_b'$, a volume expansion coefficient, and a result of charge/discharge cycle test of each of the laminated all-solid-state batteries according to comparative examples 2 and 3. Table 3 shows the average thickness $t_a$ of the solid electrolyte layer A, the average thickness $t_b$ of the solid electrolyte layer B, the average thickness ratio $t_a/t_b$, a volume expansion coefficient, and a result of charge/discharge cycle test of each of the laminated all-solid-state batteries according to examples 16 to 18 and comparative example 4 (in comparative example 4, an average thickness $t_a'$ of the solid electrolyte layer A', an average thickness $t_b'$ of the solid electrolyte layer B', and an average thickness ratio $t_a'/t_b'$). The laminated all-solid-state batteries according to examples 1 to 5 each include the solid electrolyte layer B having a thickness of 2 to 15 times the thickness of the solid electrolyte layer A laminated on the 16th layer, but the volume expansion coefficient was suppressed and excellent cycle characteristics could be obtained compared to the laminated all-solid-state batteries of comparative examples 1 to 3. On the other hand, in example 5 including the solid electrolyte layer B having a thickness of 15 times the thickness of the solid electrolyte layer A, the volume expansion was further suppressed, but the cycle characteristics were slightly deteriorated. This indicates that the thickness of the solid electrolyte layer B is too large, causing internal resistance to increase. From the above results, the volume expansion coefficient and the cycle characteristics were more excellent in the laminated all-solid-state battery including the solid electrolyte layer B having a thickness of 2 to 10 times the thickness of the solid electrolyte layer A.

In the laminated all-solid-state battery according to examples 6 to 8, while the solid electrolyte of the solid electrolyte layer B was changed to a solid electrolyte having a NASICON-type crystal structure other than LATP, the result was that the volume expansion coefficient and the cycle characteristics were superior to those of the comparative examples.

In the laminated all-solid-state batteries according to examples 9 and 10, while the solid electrolytes of the solid electrolyte layer A and the solid electrolyte B were changed to solid electrolytes having crystal structures of a garnet type and a perovskite type, the result was that the volume expansion coefficient and the cycle characteristics were superior to those of the comparative examples.

In the laminated all-solid-state battery according to example 11, while the solid electrolyte of the solid electrolyte layer B was changed to contain a plurality of solid electrolytes of LATP and LAGP, the result was that the volume expansion coefficient and the cycle characteristics were superior to those of the comparative examples.

In the laminated all-solid-state battery according to example 12, while the solid electrolytes of the solid electrolyte layer A and the solid electrolyte layer B were changed to solid electrolytes different from each other, the result was that the volume expansion coefficient and the cycle characteristics were slightly superior to those of the comparative examples.

In the laminated all-solid-state battery according to example 13, while the solid electrolyte layer B was laminated at two positions of 11th and 21st layers, the result was that the volume expansion coefficient and the cycle characteristics were superior to those of the comparative examples. The volume expansion coefficient and the cycle characteristics were superior to those of example 2 in which one solid electrolyte layer B was provided.

In the laminated all-solid-state battery according to example 14, while the solid electrolyte layer B was lami-nated at a position of the 14th layer, the result was that the volume expansion coefficient and the cycle characteristics were superior to those of the comparative examples. Therefore, it was ascertained that the lamination position of the solid electrolyte layer B acts to improve the volume expansion coefficient and the cycle characteristics even when the lamination position of the solid electrolyte layer B is not at a position that divides the number of laminations of the elements into equal parts.

In the laminated all-solid-state battery according to example 15, while the solid electrolytes of the solid electrolyte layer A and the solid electrolyte layer B were changed to solid electrolytes of LSPO, the result was that the volume expansion coefficient and the cycle characteristics were superior to those of the comparative examples.

While the laminated all-solid-state batteries according to examples 16 and 17 were examples each including a plurality of solid electrolyte layers B having different thicknesses, the result was that the volume expansion coefficient and the cycle characteristics were superior to those of the comparative examples.

While the laminated all-solid-state battery according to example 18 was an example including a plurality of solid electrolyte layers A having different thicknesses, the result was that the volume expansion coefficient and the cycle characteristics were superior to those of the comparative examples.

The comparative example 4 was a comparative example in which a plurality of solid electrolyte layers B' and a plurality of solid electrolyte layers A' having different thicknesses were provided and the average thickness ratio $t_a'/t_b'$ was less than 2, and a satisfactory volume expansion coefficient and cycle characteristics could not be obtained.

TABLE 1

| | Solid electrolyte layer A | | | Solid electrolyte layer B | | | | Laminated all-solid-state battery | | | |
|---|---|---|---|---|---|---|---|---|---|---|---|
| | Solid electrolyte | Thickness $t_a$ [µm] | Number of layers | Solid electrolyte | Thickness $t_b$ [µm] | Number of layers | Lamination position | Number of layers | Thickness ratio tb/ta | Expansion coefficient [%] | Cycle characteristics [%] |
| Example 1 | LATP | 5 | 30 | LATP | 10 | 1 | 16th layer | 31 | 2 | 0.25 | 88 |
| Example 2 | LATP | 5 | 30 | LATP | 15 | 1 | 16th layer | 31 | 3 | 0.16 | 91 |
| Example 3 | LATP | 5 | 30 | LATP | 30 | 1 | 16th layer | 31 | 6 | 0.08 | 93 |
| Example 4 | LATP | 5 | 30 | LATP | 50 | 1 | 16th layer | 31 | 10 | 0.02 | 94 |
| Example 5 | LATP | 5 | 30 | LATP | 75 | 1 | 16th layer | 31 | 15 | 0.01 | 92 |
| Example 6 | LATP | 5 | 30 | LTP | 15 | 1 | 16th layer | 31 | 3 | 0.19 | 89 |
| Example 7 | LATP | 5 | 30 | LAGP | 15 | 1 | 16th layer | 31 | 3 | 0.17 | 90 |
| Example 8 | LATP | 5 | 30 | LYZP | 15 | 1 | 16th layer | 31 | 3 | 0.18 | 89 |
| Example 9 | LLZ | 5 | 30 | LLZ | 15 | 1 | 16th layer | 31 | 3 | 0.19 | 90 |
| Example 10 | LLT0 | 5 | 30 | LLT0 | 15 | 1 | 16th layer | 31 | 3 | 0.19 | 90 |
| Example 11 | LATP | 5 | 30 | LATP + LAGP | 15 | 1 | 16th layer | 31 | 3 | 0.17 | 90 |
| Example 12 | LATP | 5 | 30 | LLZ | 15 | 1 | 16th layer | 31 | 3 | 0.34 | 82 |
| Example 13 | LATP | 5 | 30 | LATP | 15 | 2 | 11th and 21st layers | 31 | 3 | 0.07 | 93 |
| Example 14 | LATP | 5 | 30 | LATP | 15 | 1 | 14th layer | 31 | 3 | 0.18 | 90 |
| Example 15 | LSP0 | 5 | 30 | LSP0 | 15 | 1 | 16th layer | 31 | 3 | 0.21 | 84 |
| Comparative example 1 | LATP | 5 | 31 | — | — | — | — | 31 | — | 0.52 | 77 |

TABLE 2

| | Solid electrolyte layer A' | | | Solid electrolyte layer B | | | | Laminated all-solid-state battery | | | |
|---|---|---|---|---|---|---|---|---|---|---|---|
| | Solid electrolyte | Thickness $t_a'$ [µm] | Number of layers | Solid electrolyte | Thickness $t_b'$ [µm] | Number of layers | Lamination position | Number of layers | Thickness ratio tb'/ta' | Expansion coefficient [%] | Cycle characteristics [%] |
| Comparative example 2 | LATP | 5 | 30 | LATP | 6 | 1 | 16th layer | 31 | 1.2 | 0.51 | 78 |

TABLE 2-continued

| | Solid electrolyte layer A' | | | Solid electrolyte layer B | | | | Laminated all-solid-state battery | | | |
|---|---|---|---|---|---|---|---|---|---|---|---|
| | Solid electrolyte | Thickness $t_a'$ \|µm\| | Number of layers | Solid electrolyte | Thickness $t_b'$ \|µm\| | Number of layers | Lamination position | Number of layers | Thickness ratio tb'/ta' | Expansion coefficient [%] | Cycle characteristics \|%\| |
| Comparative example 3 | LATP | 5 | 30 | LATP | 8 | 1 | 16th layer | 31 | 1.6 | 0.45 | 80 |

TABLE 3

| | Solid electrolyte layer A | | | Solid electrolyte layer B | | | | Laminated all-solid-state battery | | | |
|---|---|---|---|---|---|---|---|---|---|---|---|
| | Solid electrolyte | Thickness ta [µm] | Number of layers | Solid electrolyte | Thickness tb [µm] | Number of layers | Lamination position | Number of layers | Thickness ratio tb/ta | Expansion coefficient [%] | Cycle characteristics [%] |
| Example 16 | LATP | 5 | 30 | LATP | 20 (10, 30) | 2 | 11th and 21st layers | 31 | 4 | 0.17 | 90 |
| Example 17 | LATP | 5 | 30 | LATP | 30 (10, 50) | 2 | 11th and 21st layers | 31 | 6 | 0.14 | 88 |
| Example 18 | LATP | 10 (7, 10, 13) | 1st to 10th, 12th to 20th, 22nd to 31st, layers | LATP | 20 | 2 | 11th and 21st layers | 31 | 2.0 | 0.16 | 91 |
| Comparative example 4 | LATP | 10 (7, 10, 13) | 1st to 10th, 12th to 20th, 22nd to 31st, layers | LATP | 15 | 2 | 11th and 21st layers | 31 | 1.5 | 0.48 | 79 |

Although the present invention has been described in detail above, the above-described embodiments and examples are merely examples, and the invention disclosed herein includes various changes and modifications of the above-described specific examples.

REFERENCE SIGNS LIST

0 Laminated all-solid-state battery (external view)
100 Laminated all-solid-state battery (example)
200 Laminated all-solid-state battery (comparative example)
10, 20, 20A, 30 Laminate
1 Positive electrode layer
1A Positive electrode current collector layer
1B Positive electrode active material layer
2 Negative electrode layer
2A Negative electrode current collector layer
2B Negative electrode active material layer
3 Side margin layer
4 Outer layer (green sheet for solid electrolyte)
60 Outer positive electrode
70 Outer negative electrode
A, A1, A2, A3, A4, A5 Solid electrolyte layer belonging to first group
B, B1, B2 Solid electrolyte layer belonging to second group

The invention claimed is:

1. A laminated all-solid-state battery comprising:
a laminate which includes a plurality of positive electrode layers each including a positive electrode current collector layer and a positive electrode active material layer;
a plurality of negative electrode layers each including a negative electrode current collector layer and a negative electrode active material layer;
and a plurality of solid electrolyte layers, each of which is interposed between one of the plurality of positive electrode layers and one of the plurality of negative electrode layers, and in which the positive electrode layers and the negative electrode layers are alternately laminated with the solid electrolyte layers each interposed therebetween,
wherein the plurality of solid electrolyte layers include a first solid electrolyte layer having a smallest thickness among the plurality of solid electrolyte layers,
wherein the plurality of solid electrolyte layers consists of a plurality of solid electrolyte layers belonging to a first group and at least one solid electrolyte layer belonging to a second group,
the first group is composed of the plurality of solid electrolyte layers in which the thickness of each layer is less than twice that of the first solid electrolyte layer,
the second group is composed of at least one second solid electrolyte layer in which the thickness is twice or more that of the first solid electrolyte layer, and
a relationship of the following expression (1) is satisfied when an average thickness of the plurality of solid electrolyte layers belonging to the first group is defined as $t_a$ and an average thickness of the solid electrolyte layers belonging to the second group is defined as $t_b$, $$2t_a \leq t_b \qquad (1).$$

2. The laminated all-solid-state battery according to claim 1, wherein the first group is composed of the first solid electrolyte layer and a third solid electrolyte layer having a thickness less than twice that of the first solid electrolyte layer.

3. The laminated all-solid-state battery according to claim 1, satisfying the following expression (2), $$2t_a \leq t_b \leq 10t_a \qquad (2).$$

4. The laminated all-solid-state battery according to claim 1, wherein the solid electrolyte layers belonging to the first group and the solid electrolyte layers belonging to the second group contain solid electrolytes having the same crystal structure.

5. The laminated all-solid-state battery according to claim 1, wherein the solid electrolyte layers belonging to the first group and the solid electrolyte layers belonging to the second group consist of a solid electrolyte having a crystal structure of any one selected from the group consisting of a NASICON-type, a garnet-type, a perovskite-type, and a LISICON-type crystal structures.

6. The laminated all-solid-state battery according to claim 1, wherein the solid electrolyte layers, the positive electrode layers and the negative electrode layers are laminated in a same direction.

7. The laminated all-solid-state battery according to claim 1, wherein the plurality of solid electrolyte layers belonging to the first group and the plurality of solid electrolyte layers belonging to the second group are not in contact with each other.

\* \* \* \* \*